Patented Dec. 16, 1930

1,784,941

UNITED STATES PATENT OFFICE

GUSTAV MAUTHE, OF COLOGNE-HOLWEIDE, AND ALFRED THAUSS, OF COLOGNE-DEUTZ, GERMANY, ASSIGNORS TO GENERAL ANILINE WORKS, INC., OF NEW YORK, N. Y., A CORPORATION OF DELAWARE

WATER-SOLUBLE PRODUCT FROM FATTY ACIDS OCCURRING IN WOOL FAT

No Drawing. Application filed January 31, 1929, Serial No. 336,636, and in Germany February 7, 1928.

The present invention concerns a modification and further development of the process described in the copending application Ser. No. 240,625 filed December 16, 1927 for the manufacture of water soluble products from the fatty acids occurring in wool fat and consists in subjecting said fatty acids, prior to sulfonation, to a treatment with oxygen or with gases containing oxygen at an elevated temperature.

The said parent application describes a process for the manufacture of water soluble products from the fatty acids occurring in wool fat by a treatment with sulfonating agents with the addition of a phenol. The resulting products are distinguished by their good peptonizing and protective colloid action and accordingly are well suited for the emulsification of sparingly soluble or insoluble substances and for the stabilization of easily precipitating solutions, such as for example, those of the 2.3-hydroxy-naphthoic acid arylides which may be represented by the general formula:

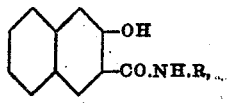

R meaning an aromatic nucleus.

In accordance with the present invention similar products exerting still better peptonizing and protective colloid properties are prepared by subjecting the fatty acids occurring in wool fat, prior to sulfonation, to a treatment with oxygen or with gases containing oxygen, such as air, at an elevated temperature, advantageously ranging between about 100–300° C. The starting material thereby becomes darker, the easily volatile, low molecular constituents being removed by the current of gas, and at the same time the acid number of the acid mixture sinks considerably, which must probably be ascribed to anhydride formation, since the saponification number only changes slightly. Furthermore the said treatment also appears to involve a partial oxidation and polymerization of the unsaturated fatty acids.

The treatment of the fatty acids occurring in wool fat with oxygen may advantageously be performed by heating the former to the temperatures above mentioned, while leading a current of oxygen or air through the mixture and stirring. In many cases it will be of advantage to add a catalytically acting substance such as those which are used in the manufacture of linseed oil varnishes, for example cobalt resinate, manganese resinate or oxides of such metals and the like. The time of treatment may vary within wide limits, mainly depending on the temperature and the catalyst used, about 4 to 20 hours being mentioned by way of example. The products thus obtainable are then subjected to a sulfonation by treating the same with a sulfonation agent, such as sulfuric acid monohydrate, chlorosulfonic acid and the like, in the presence of a phenol, whereby products are obtained forming solid, dark masses, easily soluble in hot water, exerting especially good peptonizing and protective colloid properties and being of great value for the preparation of stable alkaline aqueous solutions of 2.3-hydroxy-naphthoic acid arylides, even in the presence of calcareous water. Also difficultly soluble arylides of 2.3-hydroxy-naphthoid acid, such as 2-hydroxy-naphthoic acid β-naphthalide can be easily brought into aqueous solution by means of our new products, the solutions remaining clear even after standing for several days. The usually prescribed employment of formaldehyde has also proved advantageous, since the solutions are still more stable in the presence of formaldehyde.

The following example illustrates our invention without limiting it thereto:—

*Example.*—200 parts by weight of commercial fatty acid derived from wool fat (acid number 114,2 saponification number 137,8, iodine number 28,6) are heated for about 8 hours on an oil bath at about 180 to 200° C. while a vigorous current of air is caused to pass through. 170 parts by weight of a final product are thus obtained, which possesses the acid number 65,1, saponification number 157,5 and iodine number 28,4.

150 parts by weight of the product thus obtained are molten together with 50 parts by weight of phenol at 50–60° C., the homogeneous mixture is cooled to 30° C., stirred and treated in the course of 4 hours with 122 parts by weight of sulfuric acid monohydrate, the temperature being maintained between about 25–35° C. 300 parts by weight of fuming sulfuric acid of 20% strength are then caused to run in at the same temperature in the course of 8 hours, after which the mixture is stirred for about 1 day, the temperature being always maintained between 25–35° C. A test portion washed with a little water must yield a clear solution in hot water. The reaction mass is now poured on to 150 parts by weight of ice, whereupon the temperature rises to about 50° C. and separation into two layers occurs. The lower layer of specific gravity 1,45 is drawn off. To the upper layer are added 150 parts by weight of water, and for effecting solution the temperature is raised to 60° C. The reaction product is then precipitated by the addition of a saturated aqueous sodium sulfate solution. On standing for 2–3 hours at 80° C. the separation is completed, and then the salt solution is drawn off and the dissolving and salting out are repeated until sulfuric acid is no longer present. The crude product is then treated with 5–9 parts by weight of concentrated n-butyl alcohol and 40 parts by weight of caustic soda lye, containing 30% NaOH and left to stand for some time at 80° C., whereby the last traces of sulfate solution separate as the lower layer. The upper layer is the final product, which dissolves most readily in hot water with a weakly acid reaction. At room temperature it is a semisolid, dark, butter-like mass. It is a valuable auxiliary substance in the preparation of stable solutions of 2.3-hydroxy-naphthoic acid arylides.

5 grams of β-hydroxy-naphthoic acid-β-naphthalide are made into a paste with from 1½ to twice the quantity by weight of the product described above and a little hot water is added until a uniform magma has been formed, 15 ccm. of a caustic soda solution of 34° Bé. and about ½ liter of hot water are then added and the mixture is boiled until solution occurs, diluted to one liter and 5 ccm. of an aqueous formaldehyde solution of 40% strength are added. The solution thus obtainable is stable even after standing for several days.

We claim:—

1. Process which comprises reacting upon the fatty acids occurring in wool fat with air at a temperature between about 100–300° C. and sulfonating the products thus obtainable in the presence of a phenol.

2. Process which comprises reacting upon the fatty acids occurring in wool fat with air at a temperature between about 100–300° C. in the presence of a catalytically acting substance of the kind usually applied for the manufacture of linseed oil varnishes, and sulfonating the products thus obtainable in the presence of a phenol.

3. Process which comprises reacting upon the fatty acids occurring in wool fat with air at a temperature of about 100–300° C. for about 4 to 20 hours, and sulfonating the products thus obtainable in the presence of phenol.

4. Process which comprises reacting upon the fatty acids occurring in wool fat with air at a temperature of about 100–300° C. for about 4 to 20 hours in the presence of a catalytically acting substance of the kind usually applied for the manufacture of linseed oil varnishes, and sulfonating the products thus obtainable in the presence of phenol.

5. Process which comprises reacting upon commercial fatty acids derived from wool fat with air at about 180–200° C. for about 8 hours, adding to 150 parts by weight of the product thus obtainable 50–60 parts by weight of phenol, 122 parts by weight of sulfuric acid monohydrate, maintaining the temperature between about 25 and 25° C. for about 4 hours, adding 300 parts by weight of fuming sulfuric acid of 20% strength and stirring the mixture at 25–35° C. for about 1 day.

6. The products being obtainable according to the process claimed in claim 1, said products being semi-solid, dark, butter-like masses easily soluble in hot water.

7. The products being obtainable according to the process claimed in claim 3, said products being semi-solid, dark, butter-like masses, easily soluble in hot water.

8. The product being obtainable according to the process claimed in claim 5, said product being a semi-solid, dark, butter-like mass, easily soluble in hot water.

9. The process which comprises reacting upon the fatty acids occurring in wool fat with a gas containing oxygen, at a temperature between about 100 and 300° C., and sulfonating the products thus obtained in the presence of a phenol.

10. The process which comprises reacting upon the fatty acids occurring in wool fat with a gas containing oxygen, at a temperature between about 100 and 300° C., in the presence of a catalytically acting substance, usually applied for the manufacture of linseed oil varnishes, and sulfonating the products thus obtained in the presence of a phenol.

In testimony whereof we have hereunto set our hands.

GUSTAV MAUTHE. [L. S.]
ALFRED THAUSS. [L. S.]

CERTIFICATE OF CORRECTION.

Patent No. 1,784,941.             Granted December 16, 1930, to

GUSTAV MAUTHE ET AL.

It is hereby certified that error appears in the printed specification of the above numbered patent requiring correction as follows: Page 1, lines 79 and 80, for "2-hydroxy-napthoic acid" read 2-hydroxy-3-naphthoic acid; page 2, line 92, for "25 and 25°C" read 25 and 35°C; and that the said Letters Patent should be read with these corrections therein that the same may conform to the record of the case in the Patent Office.

Signed and sealed this 3rd day of February, A. D. 1931.

(Seal)

M. J. Moore,
Acting Commissioner of Patents.